US012771572B2

(12) United States Patent
Kawakami et al.

(10) Patent No.: US 12,771,572 B2
(45) Date of Patent: Oct. 20, 2026

(54) COMMUNICATION SYSTEM, COMMUNICATION METHOD, NETWORK DEVICE AND PROGRAM

(71) Applicant: NTT, Inc., Tokyo (JP)

(72) Inventors: Yuhei Kawakami, Musashino (JP); Hideaki Kimura, Musashino (JP); Akihiro Morita, Musashino (JP)

(73) Assignee: NTT, Inc., Tokyo (JP)

( * ) Notice: Subject to any disclaimer, the term of this patent is extended or adjusted under 35 U.S.C. 154(b) by 727 days.

(21) Appl. No.: 18/028,105

(22) PCT Filed: Oct. 1, 2020

(86) PCT No.: PCT/JP2020/037475
§ 371 (c)(1),
(2) Date: Mar. 23, 2023

(87) PCT Pub. No.: WO2022/070394
PCT Pub. Date: Apr. 7, 2022

(65) Prior Publication Data
US 2023/0327913 A1 Oct. 12, 2023

(51) Int. Cl.
*H04L 12/18* (2006.01)
*H04L 12/46* (2006.01)

(52) U.S. Cl.
CPC .......... *H04L 12/4641* (2013.01); *H04L 12/18* (2013.01)

(58) Field of Classification Search
CPC ........................................................ H04L 12/18
USPC .......................................................... 370/252
See application file for complete search history.

(56) References Cited

U.S. PATENT DOCUMENTS

2018/0091445 A1* 3/2018 Singh ...................... H04L 45/66
2020/0412640 A1 12/2020 Takeshita et al.
2021/0099323 A1 4/2021 Yazawa et al.

FOREIGN PATENT DOCUMENTS

JP 2019146045 8/2019
JP 2019149772 9/2019

OTHER PUBLICATIONS

[No Author Listed] [online], "BGP MPLS-Based Ethernet VPN," Internet Engineering Task Force (IETF) Request for Comments: 7432, Feb. 2015, retrieved from URL <https://tools.ietf.org/html/rfc7432>, 56 pages.

* cited by examiner

*Primary Examiner* — Sibte H Bukhari
(74) *Attorney, Agent, or Firm* — Fish & Richardson P.C.

(57) ABSTRACT

An object of the present disclosure is to transfer unicast via a boundary apparatus that is geographically close to a user apparatus even in communication from an L2 network to an EVPN and to prevent overlapping distribution of BUM. According to the present disclosure, there is provided a communication system in which a first network and a second network are connected to each other by a plurality of paths, in which, in the plurality of paths, a transfer prevention unit that prevents transfer of a broadcast frame, an unknown unicast frame, and a multicast frame from the second network to the first network is included, and in which a broadcast frame, an unknown unicast frame, and a multicast frame are transferred from the second network to the first network by only a specific path of the plurality of paths.

11 Claims, 7 Drawing Sheets

[1]

[1]

[7]

COMMUNICATION SYSTEM, COMMUNICATION METHOD, NETWORK DEVICE AND PROGRAM

CROSS-REFERENCE TO RELATED APPLICATIONS

This application is a National Stage application under 35 U.S.C. § 371 of International Application No. PCT/JP2020/037475, having an International Filing Date of Oct. 1, 2020.

The disclosure of the prior application is considered part of the disclosure of this application, and is incorporated by reference in its entirety into this application.

TECHNICAL FIELD

The present disclosure relates to a network apparatus that connects a plurality of networks.

BACKGROUND ART

In a network system, there is a demand for connecting networks to each other at a plurality of bases in order to improve reliability and avoid greatly detoured connection. In a case where an Ethernet virtual private network (EVPN) and a normal L2 network are connected to each other by a plurality of boundary apparatuses, it is possible to perform unicast communication in all-act setting for communication in a direction from the EVPN to the L2 network and to prevent overlapping distribution of broadcast, unknown unicast, multicast (BUM) by utilizing a designated forwarder (DF) selection function which is a basic function of the EVPN.

However, in the technique in the related art, in communication in a direction from the L2 network to the EVPN, only the same setting can be performed regardless of unicast or BUM. For this reason, in all-act setting, there is a problem that overlapping distribution of BUM is performed via a plurality of boundary apparatuses, and in single-act setting, there is a problem that both unicast and BUM may be transferred via a boundary apparatus geographically separated from a user apparatus (in a state of being greatly detoured around the network).

CITATION LIST

Patent Literature

Patent Literature 1: JP 2019-146045 A

SUMMARY OF INVENTION

Technical Problem

An object of the present disclosure is to transfer unicast via a boundary apparatus that is geographically close to a user apparatus even in communication from an L2 network to an EVPN and to prevent overlapping distribution of BUM.

Solution to Problem

According to the present disclosure, there is provided a communication system in which a first network and a second network are connected to each other by a plurality of paths, in which, in the plurality of paths, a transfer prevention unit that prevents transfer of a broadcast frame, an unknown unicast frame, and a multicast frame from the second network to the first network is included, and in which the transfer prevention unit is disabled by only a specific path of the plurality of paths, and a broadcast frame, an unknown unicast frame, and a multicast frame are transferred from the second network to the first network by only a specific path of the plurality of paths.

According to the present disclosure, there is provided a communication method executed by a communication system in which a first network and a second network are connected to each other by a plurality of network apparatuses, the method including: disabling, by only a specific path of the plurality of paths, a transfer prevention unit that prevents transfer of a broadcast frame, an unknown unicast frame, and a multicast frame from the second network to the first network, the transfer prevention unit being included in the plurality of paths; and transferring a broadcast frame, an unknown unicast frame, and a multicast frame from the second network to the first network by only a specific path of the plurality of paths.

According to the present disclosure, there is provided a network apparatus connected to a boundary between a first network and a second network, the network apparatus including: a transfer prevention unit that prevents transfer of a broadcast frame, an unknown unicast frame, and a multicast frame from the second network to the first network; a BUM passing/non-passing determination unit that acquires identification information of a network apparatus provided at a boundary between the first network and the second network via the first network, and determines enabling of the transfer prevention unit by using the acquired information; and a transfer prevention enabling unit that enables the transfer prevention unit according to the determination by the BUM passing/non-passing determination unit.

According to the present disclosure, there is provided a program for causing a computer to function as each functional unit included in the network apparatus according to the present disclosure, the program being a program for causing a computer to execute each step included in the communication method executed by the apparatus according to the present disclosure.

Advantageous Effects of Invention

According to the present invention, it is possible to transfer unicast via a boundary apparatus that is geographically close to a user apparatus even in communication from an L2 network to an EVPN and to prevent overlapping distribution of a BUM frame.

DESCRIPTION OF EMBODIMENTS

Figure 1:
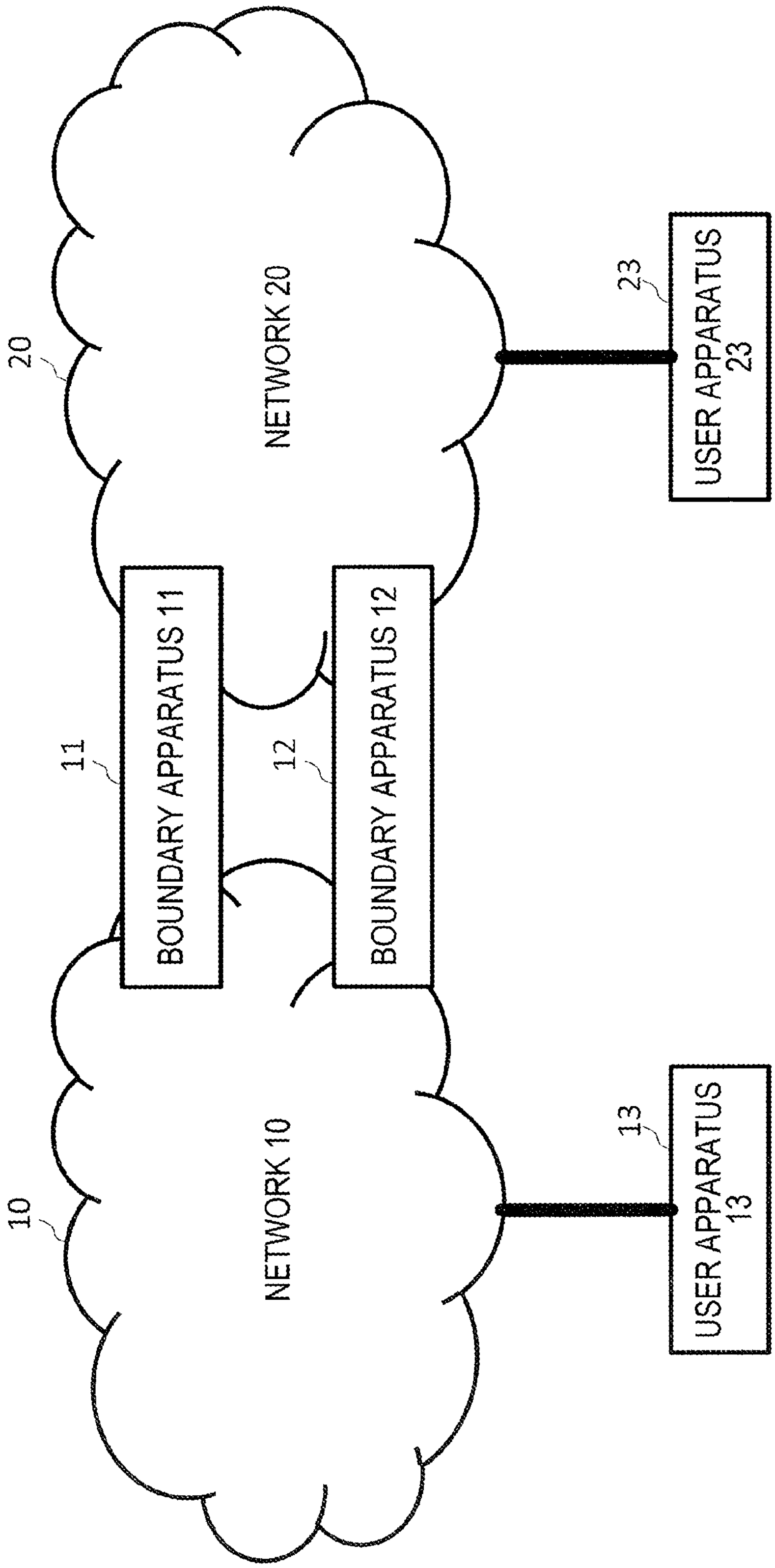
FIG. 1 is a diagram illustrating a state where networks are connected to each other via a plurality of network apparatuses.

Hereinafter, a network system that connects networks to each other via a plurality of network apparatuses according to the present invention, passes a unicast frame via all the network apparatuses, and prevents overlapping distribution of a BUM frame will be described with reference to the drawings. Note that, in the following embodiment, similar operation is performed for portions denoted by the same reference numerals, and redundant description will be omitted. Note that the network system can be applied to information and communication industries, the network system being a system that connects networks to each other via a plurality of network apparatuses according to the present disclosure, passes a unicast frame via all the network apparatuses, and prevents overlapping distribution of a BUM frame.

Hereinafter, a communication network that directly or indirectly allows traffic to pass between a plurality of apparatuses is referred to as a network. In addition, a network apparatus provided at a border, in other words, an edge of a certain network is simply referred to as a boundary apparatus.

FIG. 1 illustrates an example of a system configuration according to the present disclosure. A communication system according to the present disclosure uses a plurality of boundary apparatuses for connection between networks 10 and 20. For example, as illustrated in FIG. 1, a plurality of boundary apparatuses 11 and 12 are provided between a network 10 as a first network (hereinafter, referred to as NW #1) and a network 20 as a second network (hereinafter, referred to as NW #2). Thereby, a plurality of paths that connect the networks 10 and 20 are provided. The boundary apparatus 11 and the boundary apparatus 12 do not always directly connect the networks 10 and 20, and can communicate with each other via a plurality of apparatuses in the network 10 and the network 20.

With the network connection by the boundary apparatus 11 and the boundary apparatus 12, communication can be continued unless a plurality of boundary apparatuses fail at the same time. Further, by a method of providing the boundary apparatus 11 at a base at which a user apparatus is provided and providing the boundary apparatus 12 at a base at which another user apparatus is provided, communication between users via the network 10 and the network 20 can be performed without passing via geographically separated bases.

On the other hand, in a case where each network is an Ethernet (registered trademark) service, there is a problem in the method of using a plurality of boundary apparatuses for connection between networks as described above. In FIG. 1, it is assumed that both the network 10 and the network 20 are services which provide communication in a layer 2 of an open systems interconnection (OSI) reference model represented by Ethernet or the like. At this time, traffic (frames) arriving at the network 20 from the network 10 via the boundary apparatus 11 may flow into the network 10 again via the boundary apparatus 12. As a countermeasure against such a problem, for example, there is Patent Literature 1.

Further, another problem is particularly overlapping distribution of a BUM frame. BUM is a general term for broadcast, unknown unicast, and multicast, and these frames are transferred to all apparatuses that are reachable in an L2 network. That is, the BUM frame transmitted from the user apparatus 23 connected to the network 20 reaches both the boundary apparatus 11 and the boundary apparatus 12. Now, in a case where both the boundary apparatus 11 and the boundary apparatus 12 transfer the BUM frame to the network 10, the BUM frame reaches the user apparatus 13 connected to the network 10. This means that the single BUM traffic transmitted from the user apparatus 23 is multiplexed and distributed to the user apparatus 13 by being transferred via the plurality of boundary apparatuses.

As a method for avoiding such a problem, a method of limiting the number of the boundary apparatuses that can transfer traffic to one apparatus for traffic passing in a direction from the network 20 to the network 10 may be considered. That is, in the method, only a single network apparatus among the plurality of boundary apparatuses that connect the networks is set to an active state, and only the network apparatus in the active state is used at a certain timing. However, in the L2 network, only the same setting can be performed regardless of unicast or BUM. For example, in all-active setting, overlapping distribution of all traffic is performed via a plurality of boundary apparatuses. Further, in single-active setting, all traffic of unicast/BUM passes only via one boundary apparatus. For this reason, in a case where only the network apparatus in the active state is used, the boundary apparatus that allows traffic between two networks is limited, and thus there is a possibility that traffic needs to pass via geographically separated bases.

The disclosed present invention has been made in view of the above circumstances. An aspect of the disclosed present invention includes the following components. That is, in the communication system according to the present disclosure, a DF selection function and a filter function in a direction from the EVPN to the L2 network are combined in the boundary apparatus. In the direction from the L2 network to the EVPN, all-act setting is performed, and in the direction from the EVPN to the L2 network, BUM is also transferred in a case where the boundary apparatus is a DF. In the direction from the EVPN to the L2 network, transfer of BUM is prevented in a case where the boundary apparatus is a non-DF. In the present disclosure, a boundary apparatus serving as a DF is referred to as a specific network apparatus, and a path connected by the specific network apparatus is referred to as a specific path.

More specifically, the network apparatus according to the present disclosure is a boundary apparatus connected to a border of each of the networks 10 and 20. The boundary apparatus includes: a transfer determination unit that determines a network apparatus which can transmit a broadcast frame, an unknown unicast frame, and a multicast frame in a direction from NW #1 to NW #2 based on a result obtained by performing transmission and reception of information related to the network apparatus via NW #1; and a transfer prevention unit that realizes transfer prevention in a direction from NW #2 to NW #1. The transfer prevention unit in the direction from NW2 to NW1 is enabled by the transfer determination unit that determines a network apparatus which can transmit a frame in the direction from NW #1 to NW #2. Hereinafter, a direction from NW #1 to NW #2 is referred to as a NW #1→NW #2 direction, and a direction from NW #2 to NW #1 is referred to as a NW #2→NW #1 direction.

First Embodiment

Figure 2:
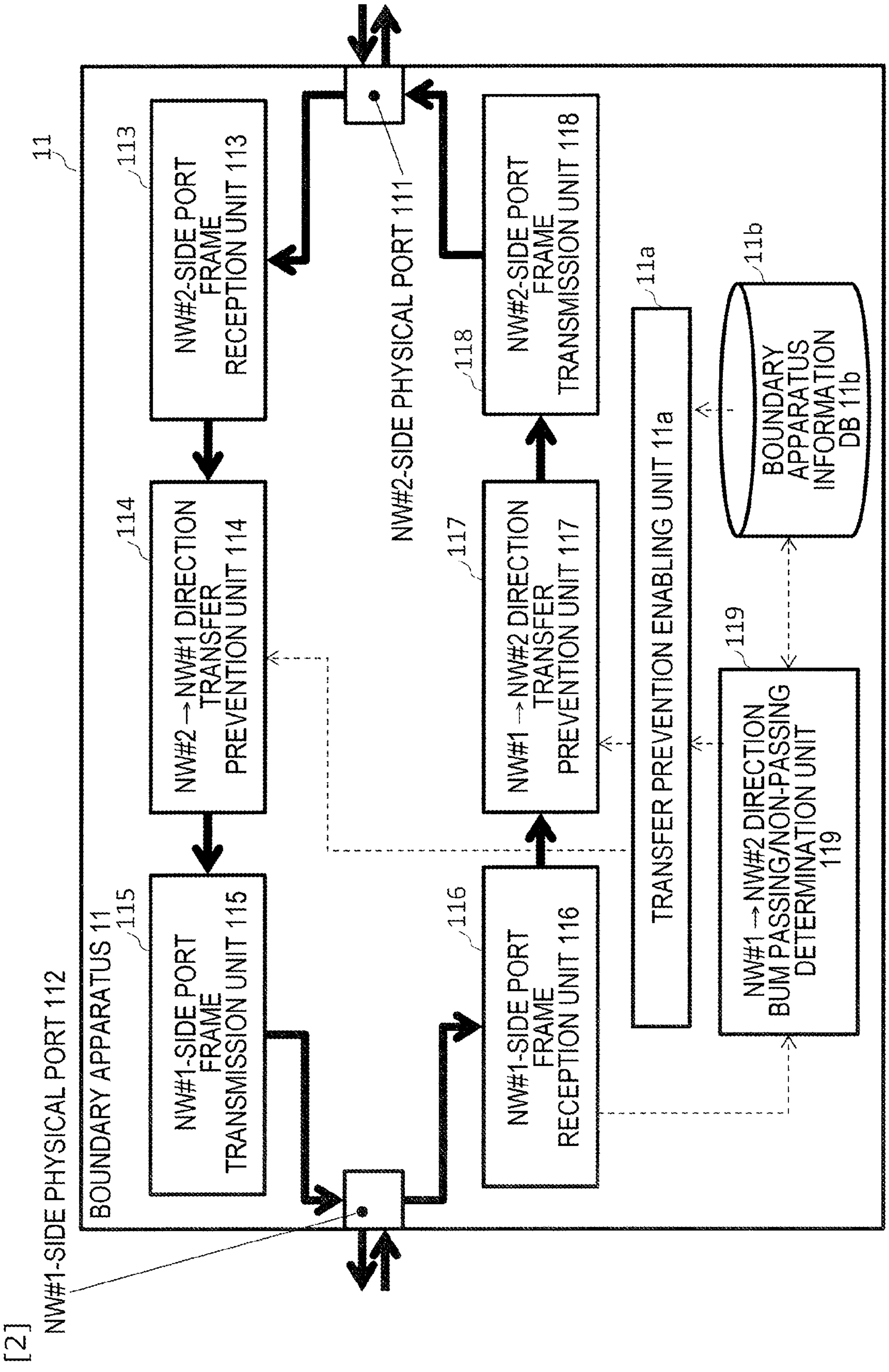
FIG. 2 is a diagram illustrating a network apparatus that prevents overlapping distribution in a direction from NW #2 to NW #1.

FIG. 2 illustrates a configuration example of the boundary apparatus 11 according to the present embodiment. The boundary apparatus 11 according to the present embodiment is a boundary apparatus including an NW #2-side physical port 111, an NW #1-side physical port 112, an NW #2-side port frame reception unit 113, an NW #2→NW #1 direction transfer prevention unit 114, an NW #1-side port frame transmission unit 115, an NW #1-side port frame reception unit 116, an NW #1→NW #2 direction transfer prevention unit 117, an NW #2-side port frame transmission unit 118, an NW #1→NW #2 direction BUM passing/non-passing determination unit 119, a transfer prevention enabling unit 11*a*, and a boundary apparatus information DB 11*b*. The boundary apparatus 12 also has a configuration similar to the configuration of the boundary apparatus 11.

In the present embodiment, the boundary apparatuses 11 and 12 have these configurations. Thus, it is possible to connect the networks to each other, to prevent traffic from passing between the networks 10 and 20, and to prevent overlapping distribution of a frame. The boundary apparatuses 11 and 12 can also be realized by a computer and a program, and the program can be provided by being recorded in a recording medium or through a network. Note that the present embodiment is directed to a network system of a layer 2 of an OSI reference model represented by Ethernet (registered trademark).

In addition, in the present embodiment, it is assumed that information related to the boundary apparatus for connecting NW #1 and NW #2 is exchanged via NW #1. Specifically, the boundary apparatus information DB 11*b* of each boundary apparatus stores boundary apparatus information indicating that the boundary apparatus is provided at a boundary between NW #1 and NW #2, and the stored boundary apparatus information is exchanged via NW #1. The boundary apparatus information is certain information for determining an apparatus corresponding to a DF (own boundary apparatus or another boundary apparatus), such as identification information of a DF apparatus. The boundary apparatus information may include identification information of the own boundary apparatus, identification information of the boundary apparatus to be connected, and port numbers of the connected own boundary apparatus and the apparatus to be connected. The identification information is, for example, a MAC address and a node ID determined in the network.

In the present disclosure, by information exchange, it is determined that a plurality of boundary apparatuses for connecting NW #1 and NW #2 exist. At this time, in a case where each boundary apparatus transfers BUM traffic, the BUM traffic is multiplexed and distributed in the direction from NW #1 to NW #2, and thus, it is necessary to uniquely determine the boundary apparatus that can transfer the BUM traffic. In a case where the boundary apparatus for connecting NW #1 and NW #2 is shared among all the boundary apparatuses, it is also possible to uniquely determine the boundary apparatus that can transfer the BUM traffic by a predetermined calculation method. As the calculation method, a certain method that can determine a unique boundary apparatus can be adopted. For example, the boundary apparatus having a smaller node ID can be used as a DF.

As a method of sharing the boundary apparatus information and selecting a single boundary apparatus that passes the BUM traffic in the direction from NW #1 to NW #2 as described above, for example, there is a method in which an Ethernet VPN (EVPN) technique is used for NW #1. It is possible to prevent multiple distribution of the BUM traffic in the direction from NW #1 to NW #2 by utilizing a designated forwarder (DF) selection function of the EVPN. For example, the NW #1→NW #2 direction BUM passing/non-passing determination unit 119 provided in the boundary apparatuses 11 and 12 selects the boundary apparatus 12 as a DF by using the DF function of the EVPN, and determines enabling/disabling of the NW #2→NW #1 direction transfer prevention unit 114.

Figure 3:
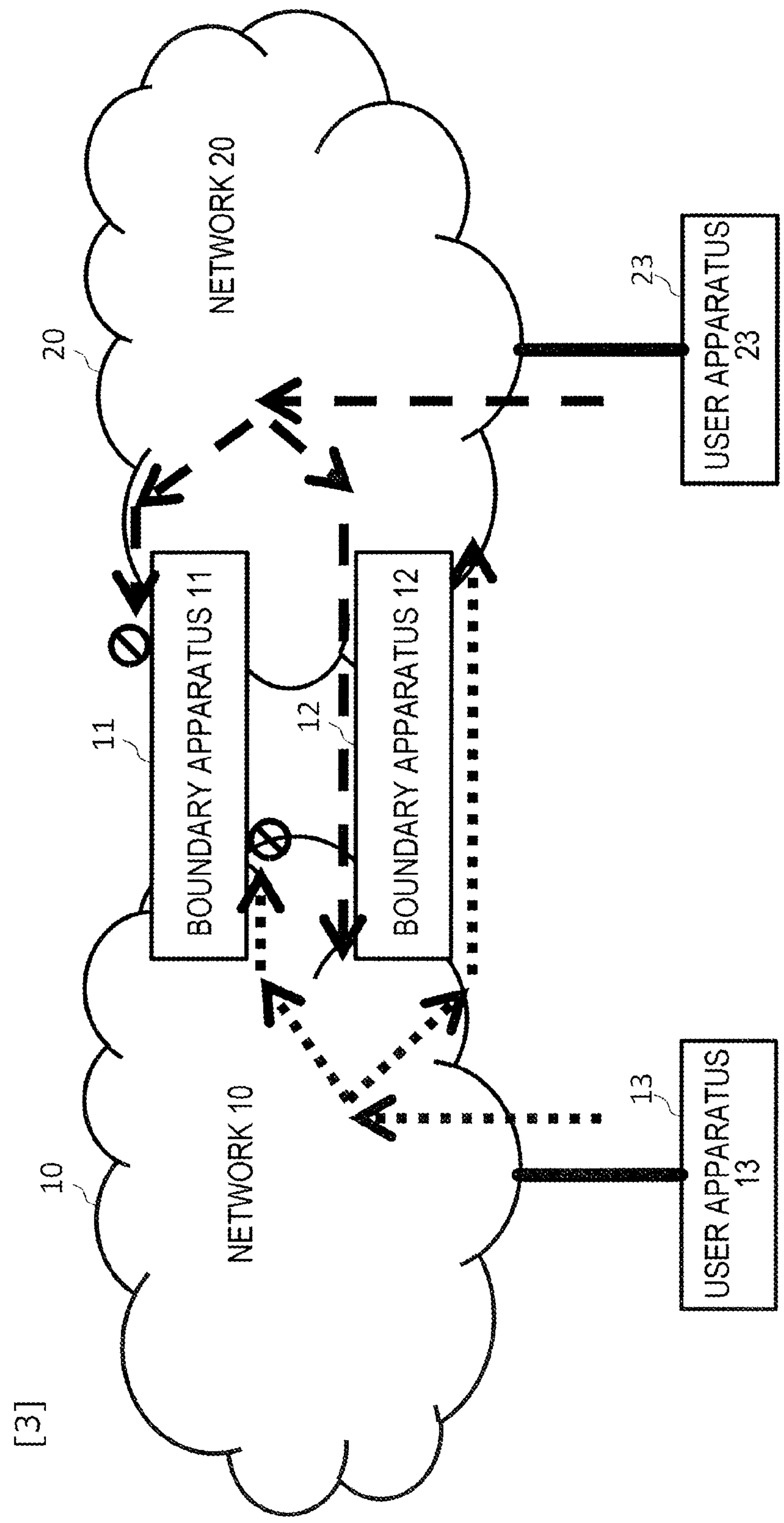
FIG. 3 is an explanatory diagram illustrating an example of an operation of a system according to the present disclosure.

In a case where the boundary apparatus 11 is a non-DF, the NW #1→NW #2 direction BUM passing/non-passing determination unit 119 provided in the boundary apparatus 11 determines not to transfer the BUM traffic. In this case, the transfer prevention enabling unit 11*a* provided in the boundary apparatus 11 enables the NW #2→NW #1 transfer prevention unit 114. Thereby, as in the boundary apparatus 11 illustrated in FIG. 3, it is possible to prevent transfer in the NW #2→NW #1 direction by the boundary apparatus 11.

In a case where the boundary apparatus 12 is a DF, the NW #1→NW #2 direction BUM passing/non-passing determination unit 119 provided in the boundary apparatus 12 determines to transfer the BUM traffic. In this case, the transfer prevention enabling unit 11*a* provided in the boundary apparatus 12 disables the NW #2→NW #1 transfer prevention unit 114. Thereby, as in the boundary apparatus 12 illustrated in FIG. 3, it is possible to perform transfer in the NW #2→NW #1 direction by the boundary apparatus 12.

In a case where the boundary apparatus 11 is a non-DF, a processing procedure of the boundary apparatus 11 is as follows, the processing procedure including receiving a frame from NW #2, that is, the network 20 in FIG. 1 by the NW #2-side physical port 111 and transmitting the received frame to NW #1, that is, the network 10 in FIG. 1.

In a case where the frame arrives at the NW #2-side physical port 111 of the boundary apparatus 11, the frame is passed to the NW #2-side port frame reception unit 113. The NW #2-side port frame reception unit 113 determines whether the received frame is a BUM frame, that is, one of a broadcast frame, an unknown unicast frame, and a multicast frame, or a unicast frame. In a case where the frame corresponds to the BUM frame, the frame is transmitted to the NW #2→NW #1 direction transfer prevention unit 114. In a case where the frame corresponds to a unicast frame, the NW #2-side port frame reception unit 113 selects a port to transmit the frame according to processing of the network system of the layer 2, that is, a learning status of a MAC address, and transmits the frame from the selected port.

In a case where an instruction to prevent frame transfer in the NW #2→NW #1 direction is given by the transfer prevention enabling unit 11*a*, the NW #2→NW #1 direction transfer prevention unit 114 performs transfer prevention of the BUM frame. As a method of preventing transfer, a filter function for the BUM frame may be used, or a method of discarding the frame by setting a buffer length for temporarily storing the BUM frame to 0 may be used. Note that a condition for issuing an instruction to prevent frame transfer in the NW #2→NW #1 direction by the transfer prevention enabling unit 11*a* will be described later.

In a case where the boundary apparatus 11 is a DF and an instruction to prevent transfer of the BUM frame in the NW #2→NW #1 direction is not given by the transfer prevention enabling unit 11*a*, the NW #2→NW #1 direction transfer prevention unit 114 selects a physical port to transmit the BUM frame according to processing of the network system of the layer 2. In the present embodiment, in order to describe a case where the NW #1-side physical port 112 exists as one of physical ports for transmitting the BUM frame, the BUM frame is transmitted to the NW #1-side port frame transmission unit 115.

The NW #1-side port frame transmission unit 115 transmits the BUM frame from the NW #1-side physical port 112.

In a case where the boundary apparatus 11 is a non-DF, a processing procedure of the boundary apparatus 11 is as follows, the processing procedure including receiving a frame from NW #1, that is, the network 10 in FIG. 1 by the NW #1-side physical port 112 and transmitting the received frame to NW #2, that is, the network 20 in FIG. 1. Note that the DF function of the EVPN may be utilized for the transfer of the BUM frame in the direction from NW #1 to NW #2.

In a case where the frame arrives at the NW #1-side physical port 112 of the boundary apparatus 11, the frame is passed to the NW #1-side port frame reception unit 116. The NW #1-side port frame reception unit 116 determines whether the received frame is a BUM frame, that is, one of a broadcast frame, an unknown unicast frame, and a multicast frame, or a unicast frame. In a case where the frame corresponds to the BUM frame, the frame is transmitted to the NW #1→NW #2 direction transfer prevention unit 117. In a case where the frame corresponds to a unicast frame, the NW #1-side port frame reception unit 116 selects a port to transmit the frame according to processing of the network system of the layer 2, that is, a learning status of a MAC address, and transmits the frame from the selected port.

The NW #2→NW #1 direction transfer prevention unit 117 performs transfer prevention of the BUM frame according to an instruction from the transfer prevention enabling unit 11*a* based on a determination result of the NW #1→NW #2 direction BUM passing/non-passing determination unit 119. In the boundary apparatus as being determined not to transfer the BUM traffic, that is, in the boundary apparatus other than an apparatus selected as a DF by using the DF function of the EVPN, the transfer prevention enabling unit 11*a* enables the NW #1→NW #2 direction transfer prevention unit 117, and the NW #1→NW #2 direction transfer prevention unit 117 prevents transfer of the BUM traffic.

On the other hand, in the boundary apparatus 12 as being determined to transfer the BUM traffic, that is, in the boundary apparatus 12 selected as a DF by using the DF function of the EVPN, the transfer prevention enabling unit 11*a* disables the function of the NW #1→NW #2 direction transfer prevention unit 117 based on a determination of the NW #1→NW #2 direction BUM passing/non-passing determination unit 119. Thus, the boundary apparatus 12 transfers the BUM traffic.

In this case, the NW #1→NW #2 direction transfer prevention unit 117 of the boundary apparatus 12 selects a physical port to transmit the BUM frame according to processing of the network system of the layer 2. In the present embodiment, in order to describe a case where the NW #2-side physical port 111 exists as one of physical ports for transmitting the BUM frame, the BUM frame is transmitted to the NW #2-side port frame transmission unit 118.

The NW #2-side port frame transmission unit 118 of the boundary apparatus 12 transmits the BUM frame from the NW #2-side physical port 111.

A feature of the present embodiment is to control transfer prevention in the NW #2→NW #1 direction by using information of the NW #1→NW2 direction BUM passing/non-passing determination unit 119, the information being represented by DF selection of the EVPN. That is, in the boundary apparatus, in a case where the NW #1→NW #2 direction BUM passing/non-passing determination unit 119 determines to prevent the BUM traffic in the direction from NW #1 to NW #2, an instruction is given to the transfer prevention enabling unit 11*a* so as to also prevent the BUM traffic in the direction from NW #2 to NW #1. As described above, the transfer prevention enabling unit 11*a* issues an instruction to prevent frame transfer in the NW #2→NW #1 direction to the NW #2→NW #1 direction transfer prevention unit 114. As a result, it is possible to prevent the BUM frame in the direction from NW #2 to NW #1 in which the information related to the boundary apparatus for connecting NW #1 and NW #2 is not exchanged.

On the other hand, a unicast frame is not subject to transfer prevention. Therefore, any one of the boundary apparatuses for connecting NW #1 and NW #2 can perform frame transfer in both the direction from NW #1 to NW #2 and the direction from NW #2 to NW #1.

As described above, in the present embodiment, the DF selection function (the NW #1→NW #2 direction BUM passing/non-passing determination unit 119) and the filter function (the NW #2→NW #1 direction transfer prevention unit 114) are combined, and the apparatus as a non-DF discards the BUM traffic (broadcast, unknown unicast, multicast) in the NW #2→NW #1 direction.

It is determined whether the frame received by the NW #2-side port frame reception unit 113 corresponds to the BUM traffic. In a case where it is determined that the received frame corresponds to the BUM traffic, the NW #2→NW #1 direction transfer prevention unit 114 prevents transfer of the BUM traffic. This function is enabled in an initial state by the transfer prevention enabling unit 11*a* in the NW #2→NW #1 direction. That is, the function is enabled in all the apparatuses, and the function is disabled only in the apparatus selected as a DF.

Second Embodiment

Figure 4:
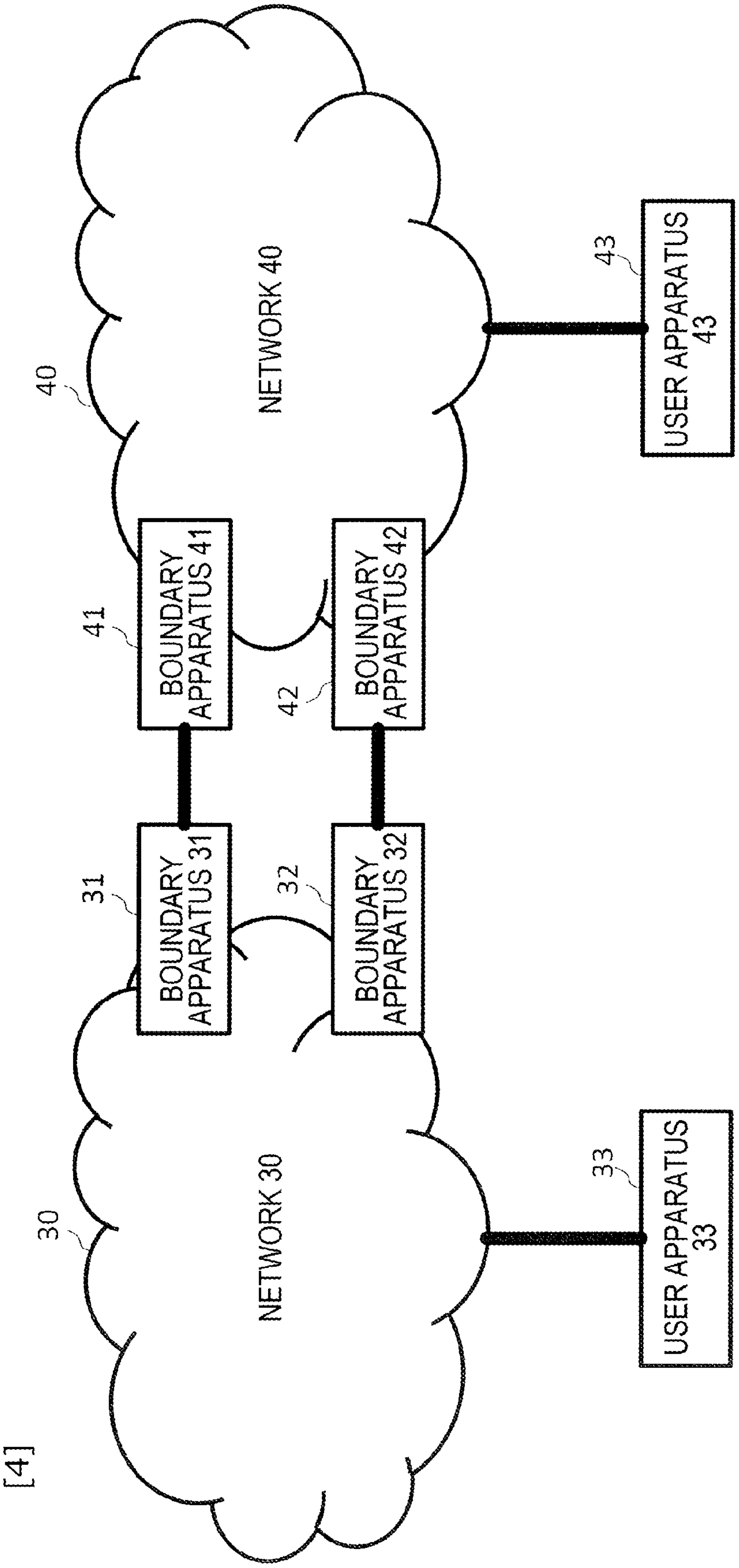
FIG. 4 is a diagram illustrating a state where networks are connected to each other via a plurality of network apparatuses.

In the first embodiment, the NW #1→NW #2 direction BUM passing/non-passing determination unit 119 and the transfer prevention enabling unit 11*a* may be provided in different apparatuses. FIG. 4 illustrates an example of a system configuration according to the present embodiment.

In a communication system according to the present embodiment, a network 30 and a network 40 are connected to each other by a boundary apparatus 31 and a boundary apparatus 41 and a boundary apparatus 32 and a boundary apparatus 42. The boundary apparatuses 31 and 32 function as first network apparatuses, and the boundary apparatuses 41 and 42 function as second network apparatuses. The communication system according to the present embodiment exchanges information related to the boundary apparatus for connecting the network 30 and another network via the network 30, and the boundary apparatus 41 performs transfer prevention in the NW #2→NW #1 direction.

Figure 5:
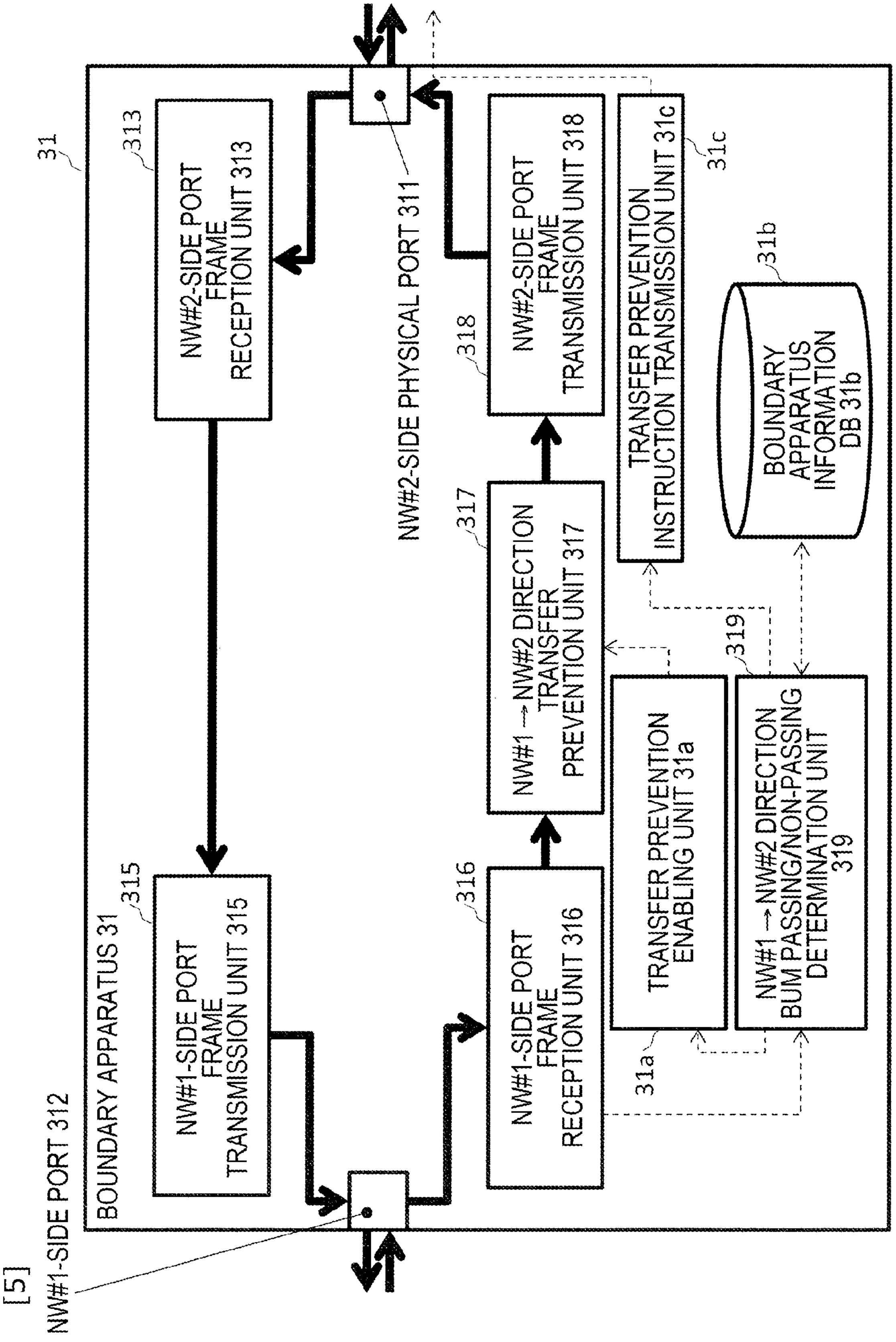
FIG. 5 is a diagram illustrating a network apparatus provided on an NW #1-side in a case where prevention of overlapping distribution in a direction from NW #2 to NW #1 is realized by a plurality of apparatuses.

FIG. 5 illustrates an example of a configuration of the boundary apparatus 31. The boundary apparatus 31 according to the present embodiment is a boundary apparatus including an NW #2-side physical port 311, an NW #1-side physical port 312, an NW #2-side port frame reception unit 313, an NW #1-side port frame transmission unit 315, an NW #1-side port frame reception unit 316, an NW #1→NW #2 direction transfer prevention unit 317, an NW #2-side port frame transmission unit 318, an NW #1→NW #2 direction BUM passing/non-passing determination unit 319, a transfer prevention enabling unit 31*a*, a boundary apparatus information DB 31*b*, and a transfer prevention instruction transmission unit 31*c*. The boundary apparatus 32 also has a configuration similar to the configuration of the boundary apparatus 31.

Figure 6:
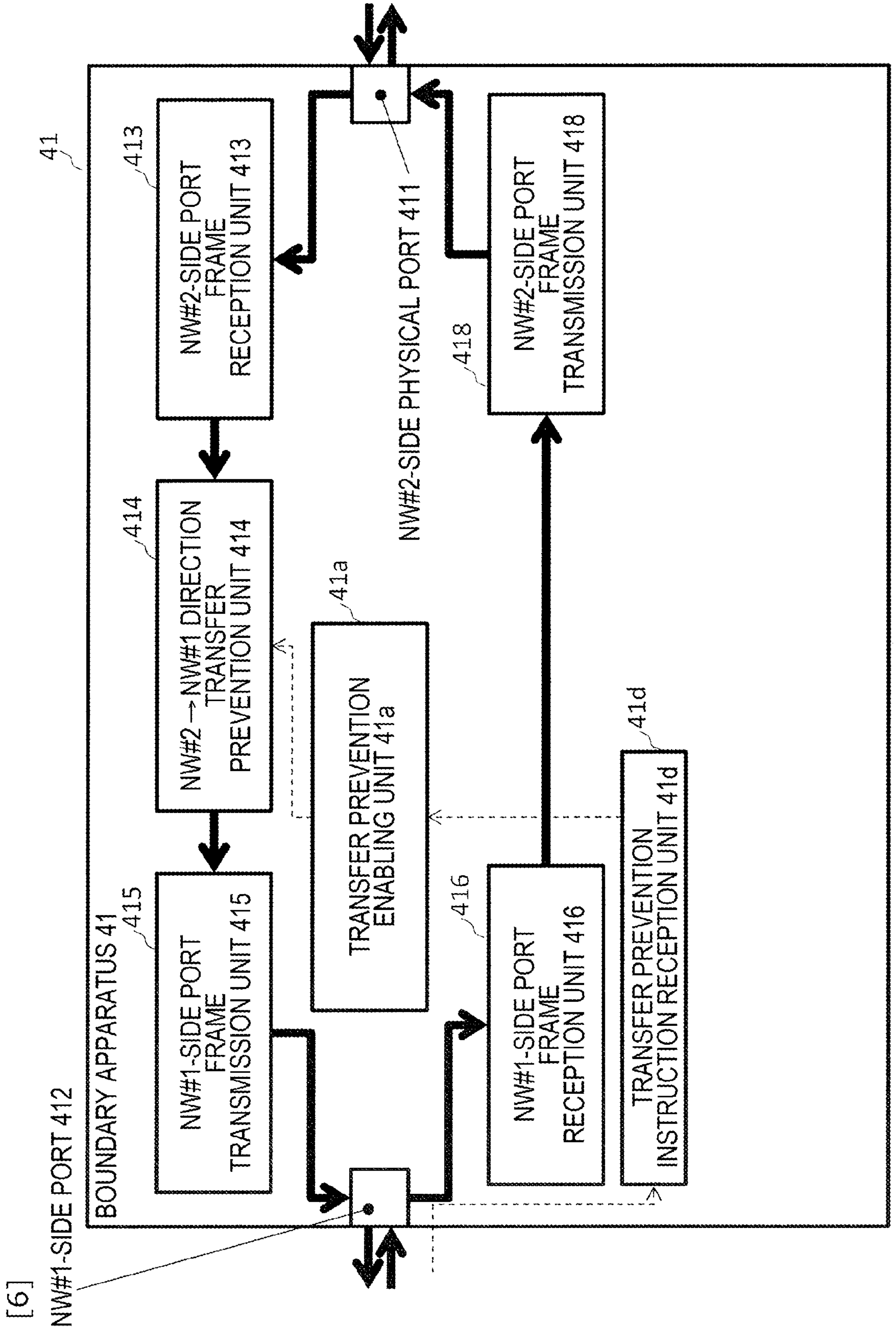
FIG. 6 is a diagram illustrating a network apparatus provided on an NW #2-side in a case where prevention of overlapping distribution in a direction from NW #2 to NW #1 is realized by a plurality of apparatuses.

FIG. 6 illustrates an example of a configuration of the boundary apparatus 41. The boundary apparatus 41 according to the present embodiment is a boundary apparatus including an NW #2-side physical port 411, an NW #1-side physical port 412, an NW #2-side port frame reception unit 413, an NW #2→NW #1 direction transfer prevention unit 414, an NW #1-side port frame transmission unit 415, an NW #1-side port frame reception unit 416, an NW #2-side port frame transmission unit 418, a transfer prevention enabling unit 41*a*, and a transfer prevention instruction reception unit 41*d*. The boundary apparatus 42 also has a configuration similar to the configuration of the boundary apparatus 41.

The NW #2-side port frame reception units 313 and 413 have functions similar to the function of the NW #2-side port frame reception unit 113, and the NW #2→NW #1 direction transfer prevention unit 414 has a function similar to the function of the NW #2→NW #1 direction transfer prevention unit 114. The NW #1-side port frame transmission units 315 and 415 have functions similar to the function of the NW #1-side port frame transmission unit 115, and the NW #1-side port frame reception units 316 and 416 have functions similar to the function of the NW #1-side port frame reception unit 116. The NW #1→NW #2 direction transfer prevention unit 317 has a function similar to the function of the NW #1→NW #2 direction transfer prevention unit 117, and the NW #2-side port frame transmission units 318 and 418 have functions similar to the function of the NW #2-side port frame transmission unit 118. The NW #1→NW #2 direction BUM passing/non-passing determination unit 319 has a function similar to the function of the NW #1→NW #2 direction BUM passing/non-passing determination unit 119, and the boundary apparatus information DB 31*b* has a function similar to the function of the boundary apparatus information DB 11*b*.

The boundary apparatus 31 does not include the NW #2→NW #1 direction transfer prevention unit 114, and includes the transfer prevention instruction transmission unit 31*c* instead of the unit. The boundary apparatus 41 does not include the NW #1→NW #2 direction transfer prevention unit 117 and the boundary apparatus information DB 11*b*, and includes the transfer prevention instruction reception unit 41*d* instead of these components. The transfer prevention enabling unit 31*a* of the boundary apparatus 31 enables/disables the NW #1→NW #2 direction transfer prevention unit 317. The transfer prevention enabling unit 41*a* of the boundary apparatus 41 enables/disables the NW #2→NW #1 direction transfer prevention unit 414.

In the present embodiment, information of the NW #1→NW #2 direction BUM passing/non-passing determination unit 319 provided in the boundary apparatus 31 that can exchange information related to the boundary apparatus for connecting the network 30 and another network is transmitted to an adjacent apparatus via the transfer prevention instruction transmission unit 31*c*. In the boundary apparatus 41 as an adjacent apparatus, the information from the NW #1→NW #2 direction BUM passing/non-passing determination unit 319 is given to the transfer prevention enabling unit 41*a* via the transfer prevention instruction reception unit 41*d*. The transfer prevention enabling unit 41*a* instructs whether to transfer or prevent the BUM traffic in the NW #2→NW #1 transfer prevention unit 414 based on the given information.

Figure 7:
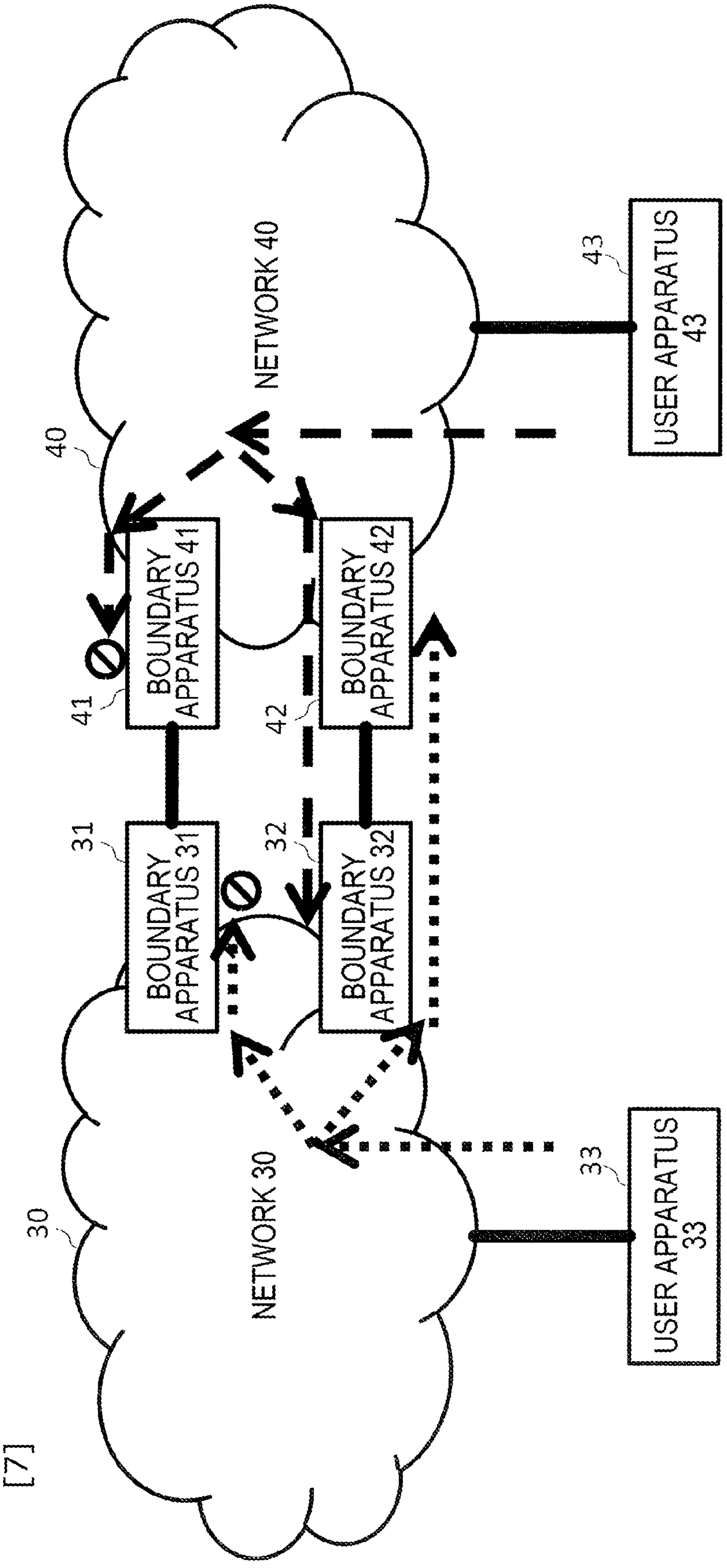
FIG. 7 is an explanatory diagram illustrating an example of an operation of the system according to the present disclosure.

For example, in a case where the boundary apparatus 31 is a non-DF, the NW #1→NW #2 direction BUM passing/non-passing determination unit 319 of the boundary apparatus 31 determines not to transfer the BUM traffic. The transfer prevention instruction transmission unit 31*c* of the boundary apparatus 31 transmits a message indicating that the boundary apparatus 31 is a non-DF to the boundary apparatus 41. In a case where the message indicating that the boundary apparatus 31 is a non-DF is received, the transfer prevention instruction reception unit 41*d* of the boundary apparatus 41 transmits the message to the transfer prevention enabling unit 41*a*. The transfer prevention enabling unit 41*a* of the boundary apparatus 41 enables the NW #2→NW #1 transfer prevention unit 414. Thereby, as illustrated in FIG. 7, it is possible to prevent transfer in the NW #2→NW #1 direction by the boundary apparatus 41.

In a case where the boundary apparatus 32 is a DF, the NW #1→NW #2 direction BUM passing/non-passing determination unit 319 of the boundary apparatus 32 determines to transfer the BUM traffic. The transfer prevention instruction transmission unit 31*c* of the boundary apparatus 32 transmits a message indicating that the boundary apparatus 32 is a DF to the boundary apparatus 42. In a case where the message indicating that the boundary apparatus 32 is a DF is received, the transfer prevention instruction reception unit 41*d* of the boundary apparatus 42 transmits the message to the transfer prevention enabling unit 41*a*. The transfer prevention enabling unit 41*a* of the boundary apparatus 42 disables the NW #2→NW #1 transfer prevention unit 414. Thereby, as illustrated in FIG. 7, it is possible to perform transfer in the NW #2→NW #1 direction by the boundary apparatus 42.

As described above, in the present embodiment, the DF selection function (the NW #1→NW #2 direction BUM passing/non-passing determination unit 319) and the filter function (the NW #2→NW #1 direction transfer prevention unit 414) are combined, and the boundary apparatus as a non-DF prevents transfer of the BUM traffic (broadcast, unknown unicast, multicast) in the NW #2→NW #1 direction.

In the present embodiment, the boundary apparatus 31 that performs DF determination and the boundary apparatus 41 that actually discards a frame are separated from each other. The boundary apparatus 31 notifies the adjacent apparatus of whether the boundary apparatus is a DF or a non-DF. The adjacent boundary apparatus 41 discards the frame based on the notified information. In the case of FIG. 4, the boundary apparatuses 31 and 32 are apparatuses that determine whether the boundary apparatus is a DF or a non-DF, and the boundary apparatuses 41 and 42 correspond to adjacent apparatuses that discard frames.

It is difficult to determine which of the boundary apparatus 41 or 42 passes BUM. For this reason, by transferring the DF selection information, this can be realized. The boundary apparatuses 31, 32, 41, and 42 can also be realized by a computer and a program, and the program can be provided by being recorded in a recording medium or through a network.

Note that the present disclosure is not limited to the embodiments. These embodiments are merely examples, and the present disclosure can be carried out in forms with various modifications and improvements based on the knowledge of those skilled in the art.

INDUSTRIAL APPLICABILITY

The present disclosure can be applied to information and communication industries.

REFERENCE SIGNS LIST

10, 20, 30, 40 Network
11, 12, 31, 32, 41, 42 Boundary apparatus
13, 23, 33, 43 User apparatus
111, 311, 411 NW #2-side physical port
112, 312, 412 NW #1-side physical port
113, 313, 413 NW #2-side port frame reception unit
114, 414 NW #2→NW #1 direction transfer prevention unit
115, 315, 415 NW #1-side port frame transmission unit
116, 316, 416 NW #1-side port frame reception unit
117, 317 NW #1→NW #2 direction transfer prevention unit
118, 318, 418 NW #2-side port frame transmission unit
119, 319 NW #1→NW #2 direction BUM passing/non-passing determination unit
11*a*, 31*a*, 41*a* Transfer prevention enabling unit
11*b*, 31*b* Boundary apparatus information DB
31*c* Transfer prevention instruction transmission unit
41*d* Transfer prevention instruction reception unit

The invention claimed is:

1. A communication system in which a first network and a second network are connected to each other by a plurality of paths, the communication system comprising:
in the plurality of paths, a transfer prevention unit, including one or more processors, configured to prevent transfer of a broadcast frame, an unknown unicast frame, and a multicast frame from the second network to the first network, wherein:
the transfer prevention unit is disabled by only a specific path of the plurality of paths, and a broadcast frame, an unknown unicast frame, and a multicast frame are transferred from the second network to the first network by only a specific path of the plurality of paths,
wherein the transfer prevention unit is configured to prevent transfer of the broadcast frame, the unknown unicast frame, and the multicast frame while permitting transfer of known unicast frames on the paths other than the specific path in the plurality of paths,
wherein the transfer prevention unit is configured to prevent transfer of the broadcast frame, the unknown unicast frame, and the multicast frame by setting a buffer length for temporarily storing frames to zero.

2. The communication system according to claim 1, wherein
the first network is an Ethernet virtual private network (EVPN),
the second network is an L2 network, and
the specific path is determined by using a designated forwarder (DF) function of the EVPN.

3. The communication system according to claim 1, further comprising:
a network apparatus provided on the plurality of paths comprising:
a BUM passing/non-passing determination unit, including one or more processors, configured to acquire identification information of a network apparatus provided at a boundary between the first network and the second network via the first network, and determines enabling of the transfer prevention unit by using the acquired information, and
a transfer prevention enabling unit, including one or more processors, configured to enable the transfer prevention unit according to the determination by the BUM passing/non-passing determination unit.

4. The communication system according to claim 3, wherein
in at least one path of the plurality of paths,
a first network apparatus connected to the first network and a second network apparatus connected to the second network are connected to each other,
the first network apparatus includes the BUM passing/non-passing determination unit, and
the second network apparatus includes the transfer prevention enabling unit and the transfer prevention unit.

5. A communication method executed by a communication system in which a first network and a second network are connected to each other by a plurality of network apparatuses, the method comprising:
disabling, by only a specific path of a plurality of paths, a transfer prevention unit that prevents transfer of a broadcast frame, an unknown unicast frame, and a multicast frame from the second network to the first network, the transfer prevention unit being included in the plurality of paths;
transferring a broadcast frame, an unknown unicast frame, and a multicast frame from the second network to the first network by only a specific path of the plurality of paths; and
preventing transfer of the broadcast frame, the unknown unicast frame, and the multicast frame while permitting transfer of known unicast frames on the paths other than the specific path in the plurality of paths by setting a buffer length for temporarily storing frames to zero.

6. A network apparatus connected to a boundary between a first network and a second network, the network apparatus comprising:
a transfer prevention unit, including one or more processors, configured to prevent transfer of a broadcast frame, an unknown unicast frame, and a multicast frame from the second network to the first network while permitting transfer of known unicast frames from the second network to the first network;
a BUM passing/non-passing determination unit, including one or more processors, configured to acquire identification information of a network apparatus provided at a boundary between the first network and the second network via the first network, and determine enabling of the transfer prevention unit by using the acquired information; and
a transfer prevention enabling unit, including one or more processors, configured to enable the transfer prevention unit according to the determination by the BUM passing/non-passing determination unit,
wherein the transfer prevention unit is configured to prevent transfer of the broadcast frame, the unknown unicast frame, and the multicast frame by setting a buffer length for temporarily storing frames to zero.

7. The network apparatus according to claim 6, wherein
the first network is an EVPN, and
the BUM passing/non-passing determination unit determines enabling of the transfer prevention unit by using a DF function of the EVPN.

8. A non-transitory computer-readable storage medium storing a program for causing a computer to function as each functional unit included in the network apparatus according to claim 6.

9. A non-transitory computer-readable storage medium storing a program for causing a computer to function as each functional unit included in the network apparatus according to claim 7.

10. The communication method according to claim 5, wherein:

the first network is an Ethernet virtual private network (EVPN), the second network is an L2 network, and the specific path is determined by using a designated forwarder (DF) function of the EVPN.

11. The communication system according to claim 4, wherein the first network apparatus includes a transfer prevention instruction transmission unit configured to, upon determining the first network apparatus is not the specific path, transmit a transfer prevention instruction message to the second network apparatus, and wherein the transfer prevention enabling unit of the second network apparatus enables the transfer prevention unit in response to receiving the transfer prevention instruction message from the first network apparatus.

* * * * *